Figure 1:
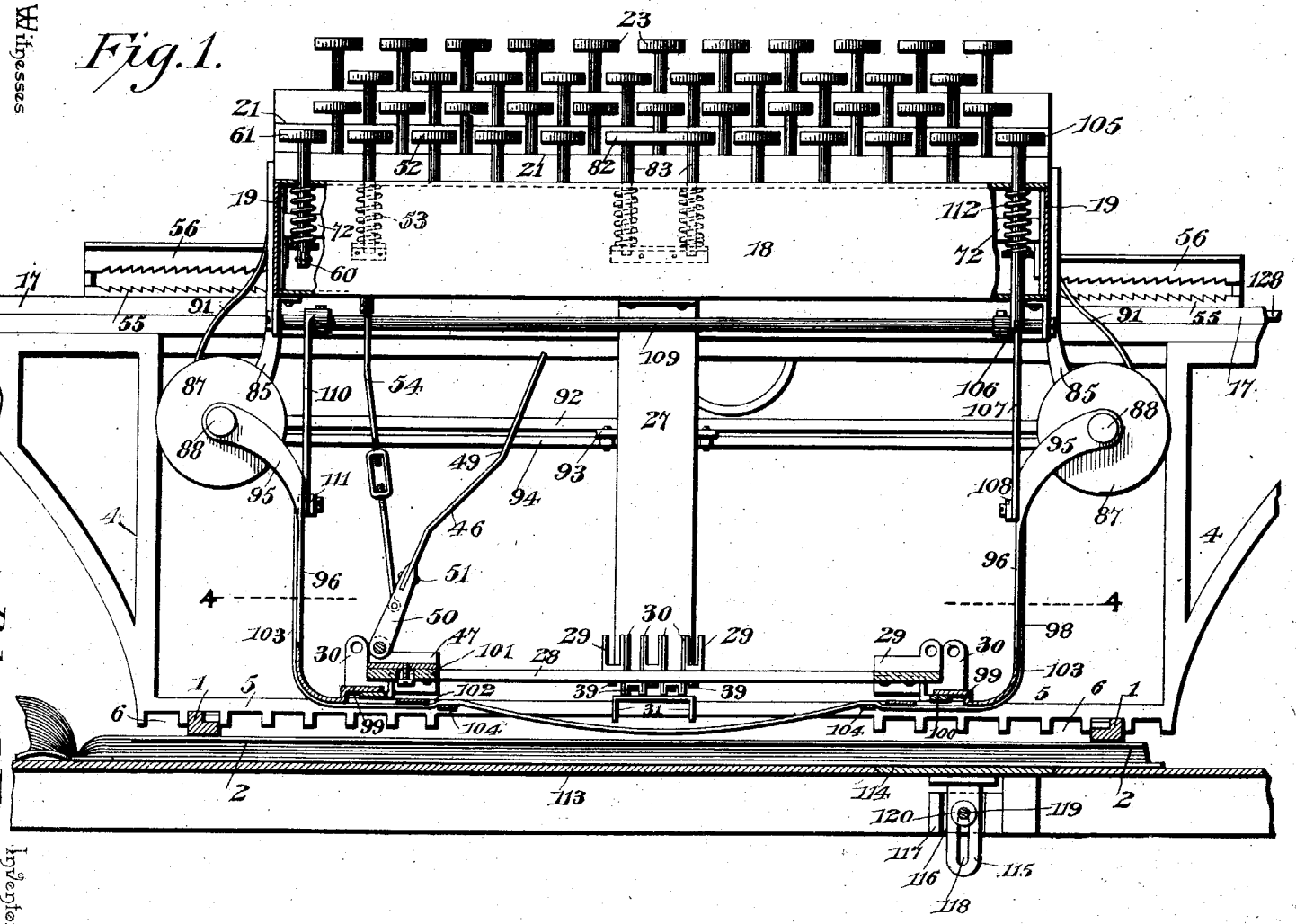

No. 11,850. Reissued Sept. 4, 1900.

R. J. FISHER.

TYPE WRITING MACHINE.

(Application filed Oct. 19, 1898.)

5 Sheets—Sheet 1.

Witnesses

Jas. K. McCutchan

Inventor

By his Attorneys, Robert J. Fisher

C. A. Snow & Co.

11,850

No. 11,858.

Reissued Sept. 4, 1900.

R. J. FISHER.

TYPE WRITING MACHINE.

(Application filed Oct. 19, 1898.)

5 Sheets—Sheet 2.

Witnesses

Jas. F. McCathran

Robert J. Fisher Inventor

By his Attorneys,

C. A. Snow & Co.

No. 11,850. Reissued Sept. 4, 1900.

R. J. FISHER.

TYPE WRITING MACHINE.

(Application filed Oct. 19, 1898.)

5 Sheets—Sheet 3.

Witnesses

Jas. E. McCathran

Robert J. Fisher, Inventor

By his Attorneys,

C. A. Snow & Co.

No. 11,850. Reissued Sept. 4, 1900.

R. J. FISHER.

TYPE WRITING MACHINE.

(Application filed Oct. 19, 1898.)

5 Sheets—Sheet 4.

Witnesses

Jas. F. McCathran

D. D. Hoyle

Robert J. Fisher, Inventor

By his Attorneys.

C. A. Snow & Co.

No. 11,850. Reissued Sept. 4, 1900.
R. J. FISHER.
TYPE WRITING MACHINE.
(Application filed Oct. 19, 1898.)
5 Sheets—Sheet 5.
Fig. 5.
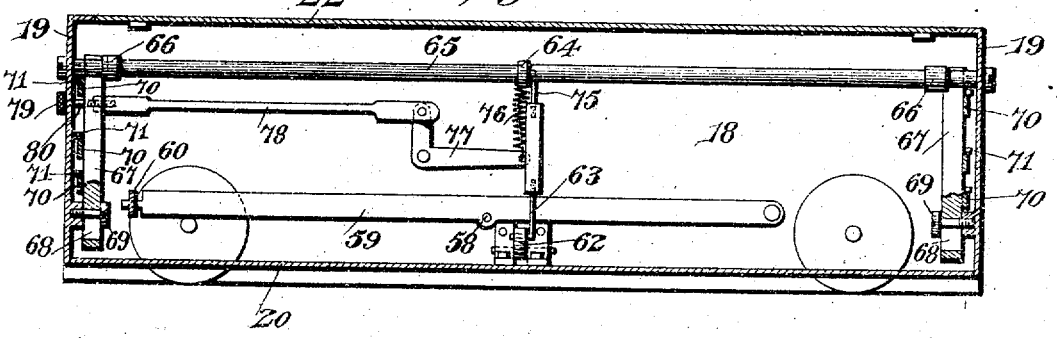
Fig. 6.
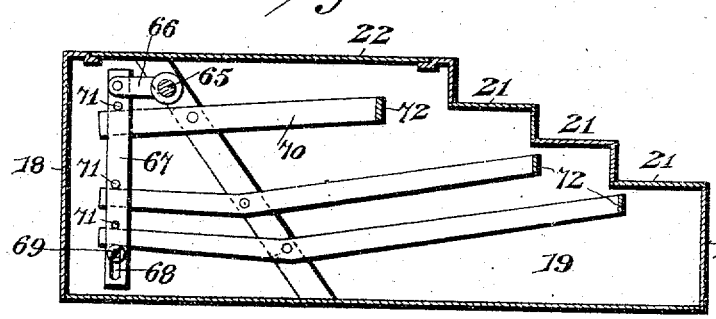
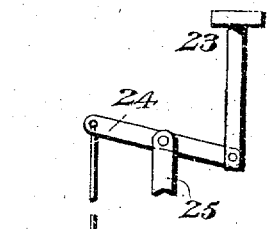
Fig. 14.
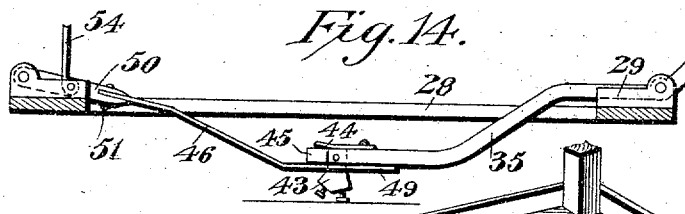
Fig. 12.
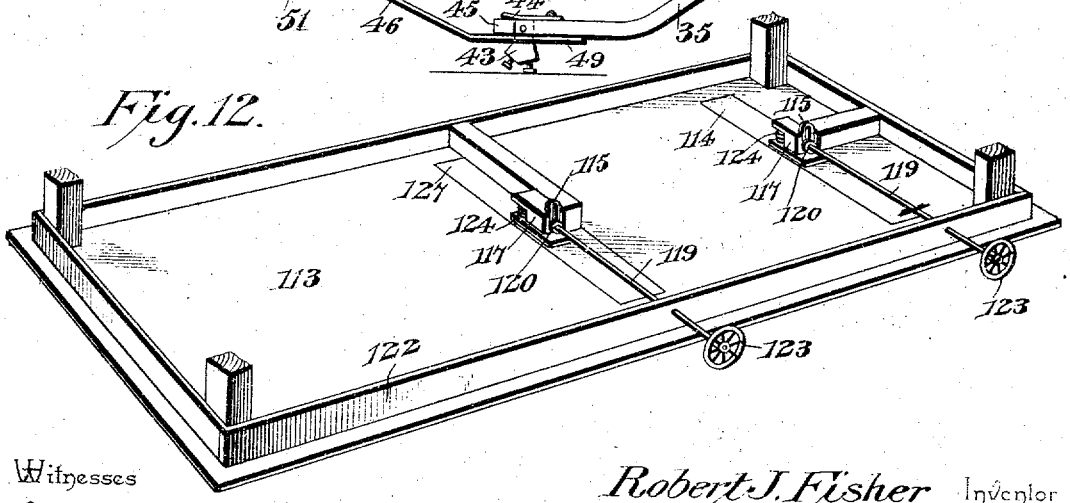
Witnesses
Jas. H. McCathran
O. E. Hoyle
Robert J. Fisher Inventor
By his Attorneys.
C. A. Snow & Co.

UNITED STATES PATENT OFFICE.

ROBERT JOSEPH FISHER, OF ATHENS, TENNESSEE, ASSIGNOR TO THE FISHER TYPEWRITER COMPANY, OF TENNESSEE.

TYPE-WRITING MACHINE.

SPECIFICATION forming part of Reissued Letters Patent No. 11,850, dated September 4, 1900.

Original No. 569,627, dated October 20, 1893. Application for reissue filed October 19, 1898. Serial No. 694,041.

*To all whom it may concern:*

Be it known that I, ROBERT JOSEPH FISHER, a citizen of the United States, residing at Athens, in the county of McMinn and State of Tennessee, have invented a new and useful Type-Writing Machine, of which the following is a specification.

My invention relates to type-writing machines, and particularly to improvements upon the constructions shown and described in my former applications, Serial No. 489,834, filed October 31, 1893; Serial No. 517,324, filed July 12, 1894; Serial No. 530,400, filed November 30, 1894, and Serial No. 545,508, filed April 12, 1895; and the objects in view are to improve the construction of the type-bar-supporting ring, to facilitate the application and removal of the type-bars and arrange the same compactly, to provide improved means for shifting the ribbon to expose the line of writing, to provide an improved and simple construction of carriage, to provide means for reducing the interval between the front and rear longitudinal carriage-guides, whereby twisting and vibration of the carriage under the action of the carriage-feeding mechanism are prevented, to provide improved connections between the keys and carriage-feeding mechanism, to simplify the construction and reduce the number of operating parts, to provide an improved construction of upper and lower case shifting mechanism, and, furthermore, to provide an improved construction of support and means for holding the book in position for writing.

Further objects and advantages of this invention will appear in the following description, and the novel features thereof will be particularly pointed out in the appended claims.

Figure 2:
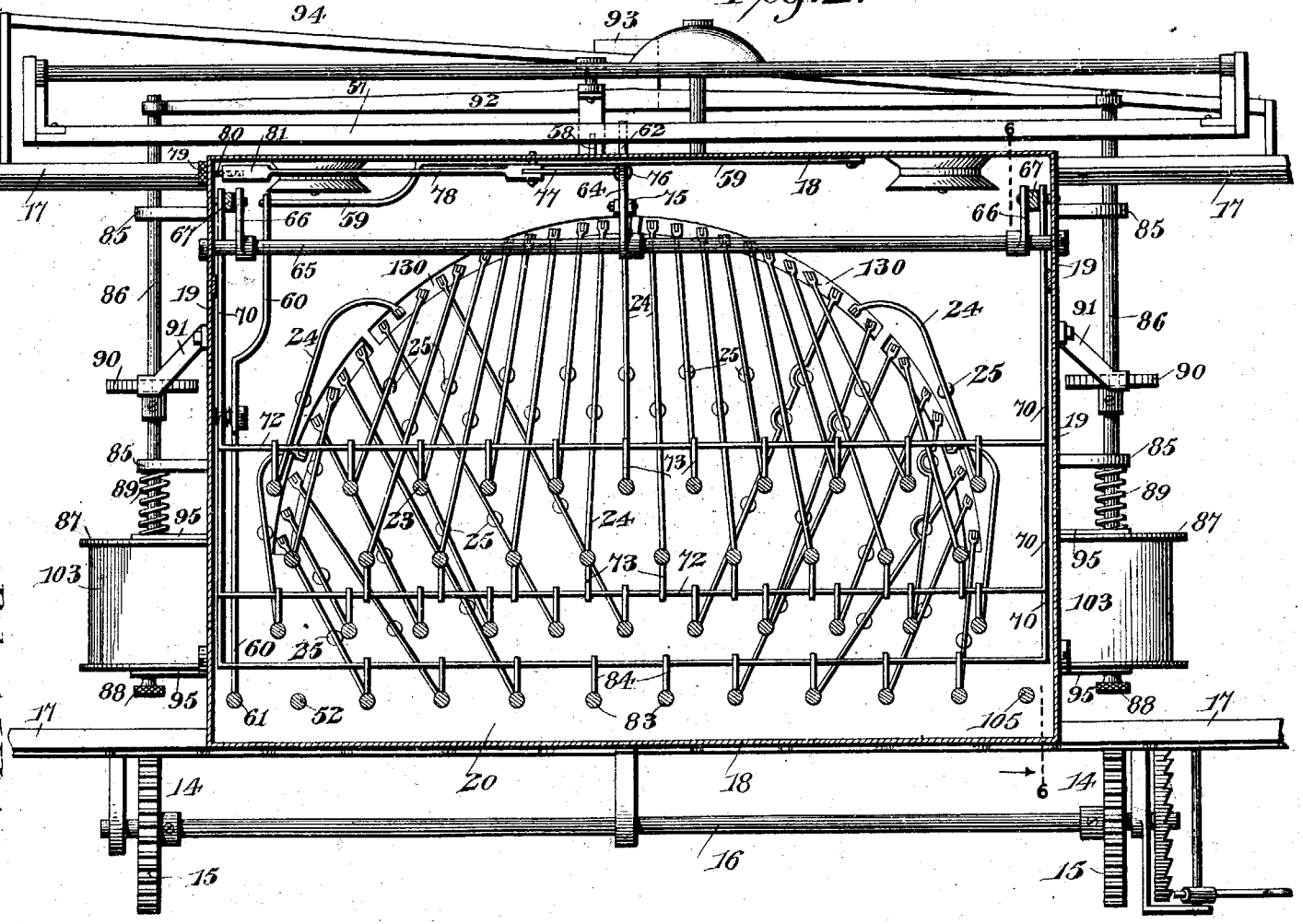
Figure 3:
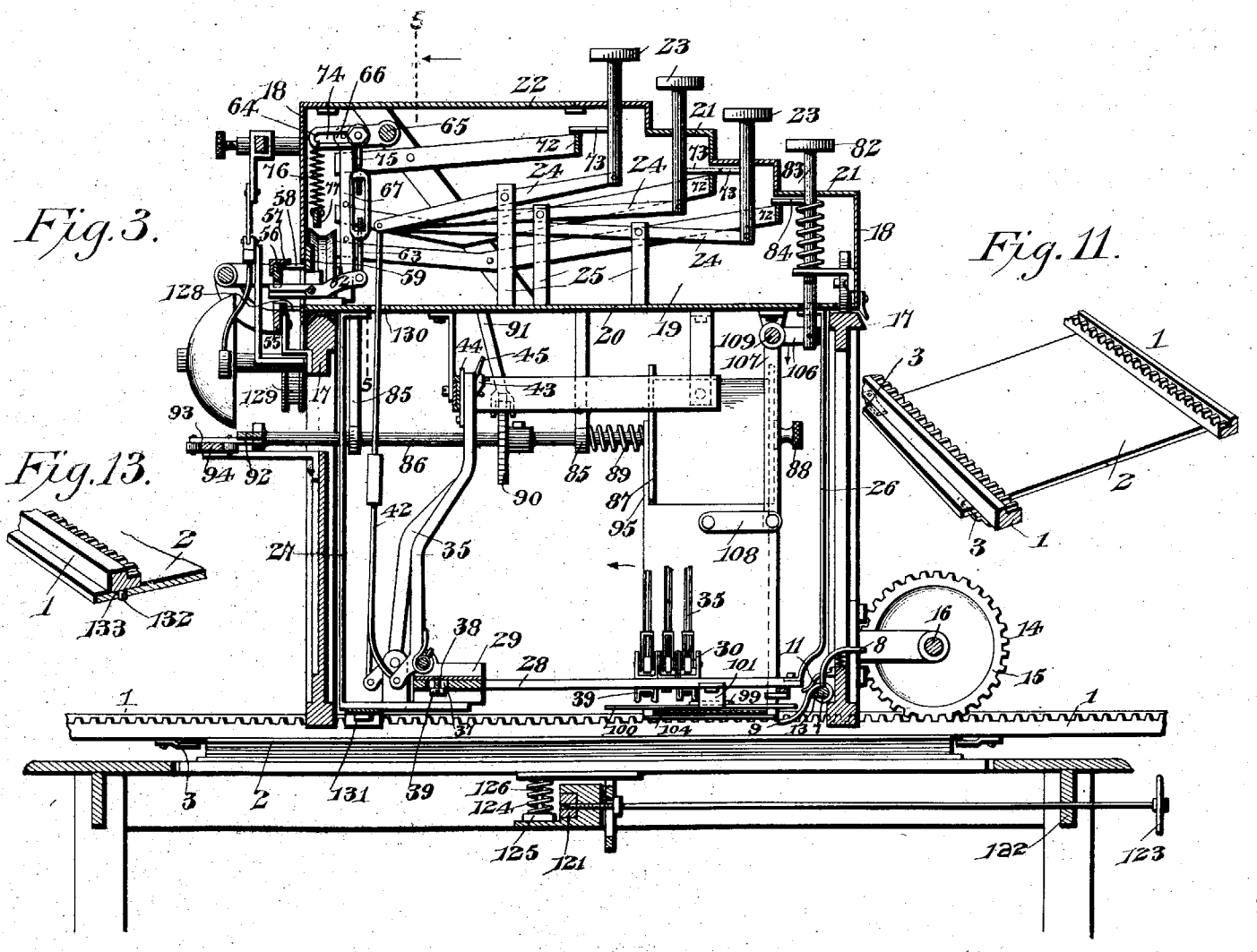
Figure 4:
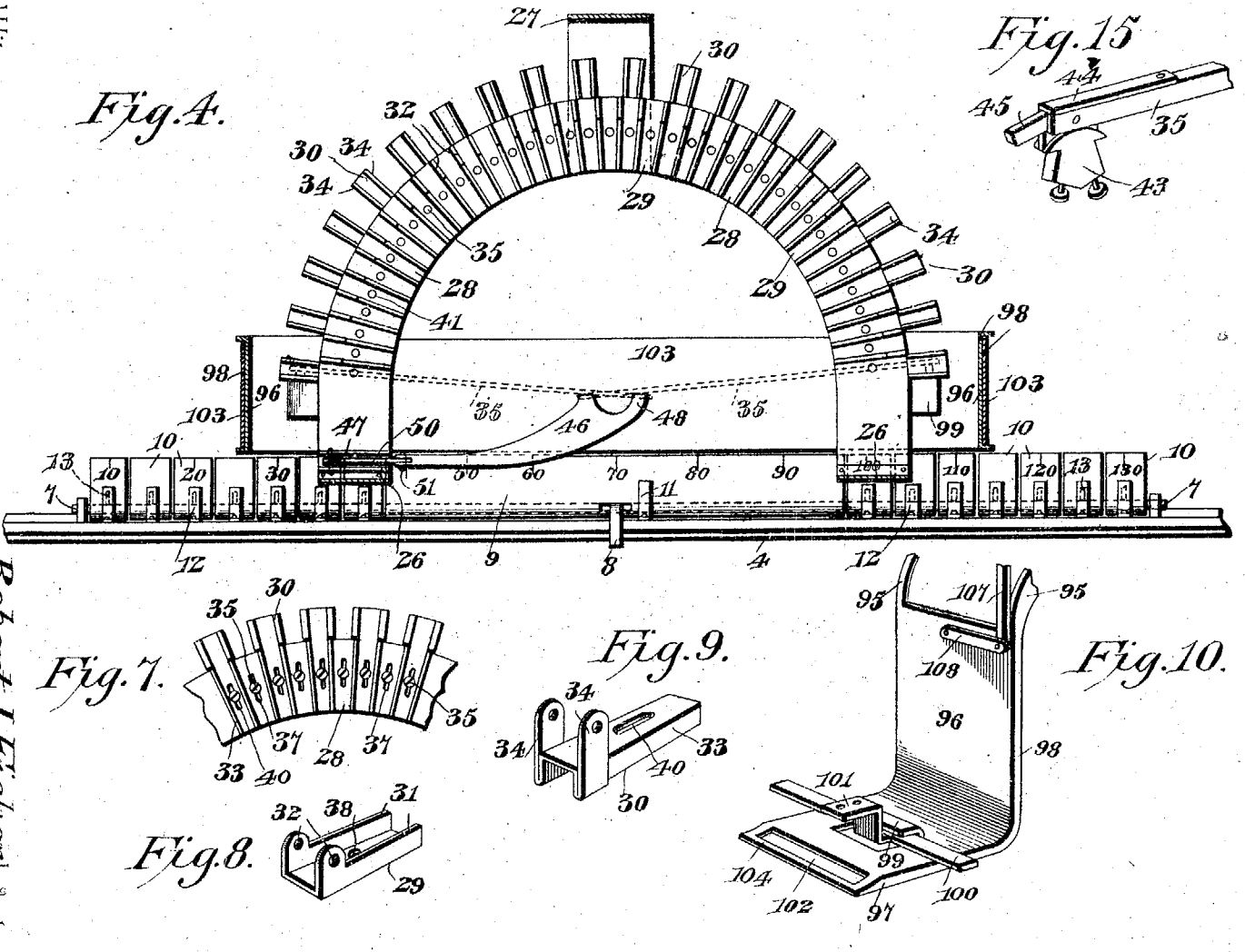

In the drawings, Figure 1 is a front view, partly in longitudinal section, of a type-writing machine constructed in accordance with my invention. Fig. 2 is a plan view of the same with the carriage shown in horizontal section to illustrate the positions of the key-levers. Fig. 3 is a transverse vertical section. Fig. 4 is a horizontal section on the line 4 4 of Fig. 1, showing the type-head-shifting lever depressed to its operative position. Fig. 5 is a vertical longitudinal section of the carriage upon the line 5 5 of Fig. 3. Fig. 6 is a transverse vertical section of the carriage on the line 6 6 of Fig. 2. Fig. 7 is a detail inverted plan view of a portion of the type-bar-supporting ring. Fig. 8 is a detail view in perspective of one of the upper adjustable type-bar-bearing clips. Fig. 9 is a similar view of one of the lower type-bar-bearing clips. Fig. 10 is a detail view in perspective of a portion of one of the ribbon-guides and means for mounting the same upon the type-bar-supporting ring. Fig. 11 is a detail view of the printing plate or platen detached. Fig. 12 is a detail view in perspective of the support or table inverted. Fig. 13 is a detail view showing a slightly-different construction of means for securing the adjustable track to the platen. Fig. 14 is a detail view of the type-head and shifting-arm in the positions which they occupy when an upper-case character is printed. Fig. 15 is a detail view in perspective of the type-head and the contiguous portion of the lever.

Similar numerals of reference indicate corresponding parts in all the figures of the drawings.

The machine embodying my invention is mounted for movement transverse to the line of writing upon tracks 1, similar to those shown and described in my former applications above noted, said tracks being adapted to rest upon the sheet or page to receive the impression and serving to hold said sheet or page in proper position for receiving the impact of the type-heads. In connection with said tracks I preferably employ a printing plate or platen 2, having a surface of hard rubber or its equivalent, and when engaged in bookwork this plate or platen is preferably inserted between the leaf to receive the impression and the subjacent body of the book. The track or guide which is arranged contiguous to one edge of the plate or platen is loose to provide for the necessary lateral adjustment to suit the width of the sheet or page upon which the impression is to be made, and the track at the other edge of the plate or platen is fixed at its extremities thereto by means of clips 3, the intermediate portion of the track being unconnected with the plate or platen to provide for slipping the edge of the sheet or leaf thereunder. Said clips engage the end or upper and lower edges of the plate or platen to provide for the adjustment of the track parallel with said edges or parallel with the line of writing, whereby the edge of the leaf may be properly engaged between the same and the plate. It will be seen that each of the tracks spans the platen (which is sufficiently rigid to form a suitable backing for the leaf upon which the printing is being effected) and holds the leaf in a flat operative position upon the platen and also that the tracks are separate from the platen, one being wholly unconnected therewith and the other being mounted thereon for movement parallel with the lines of writing, while being held for movement transverse to the lines of writing by the described clips, which thus prevent endwise movement of the tracks due to the jar of the frame traversing the tracks. Also, preferably, as shown in the drawings, these tracks are disconnected or are unconnected with each other; but although preferable this feature of construction is not indispensable, provided the tracks are constructed separate from the platen to allow the described arrangement of the leaf or sheet between the under surfaces of the tracks and the continuously-unobstructed surface of the platen.

The frame 4 is provided with front and rear bars 5, having a plurality of seats 6 for engagement, respectively, with the tracks to suit different intervals between the latter, and mounted upon the frame contiguous to the front bar 5 is a gage consisting of a rock-shaft 7, provided at an intermediate point with a key 8, a main gage-plate 9, which in length corresponds with the interval between the innermost seats 6, and a series of auxiliary gage-plates 10, which correspond in width and in number with the seats and normally occupy positions in alinement with the main gage-plate, whereby they serve as continuations of the main gage-plate. The main gage plate is provided with an actuating-spring 11 to hold it normally in its depressed or operative position, as shown in Fig. 3, and the auxiliary gage-plates, which are loosely mounted upon the rock-shaft, are each provided with an actuating-spring 12, Fig. 4. When it is necessary to raise the edge of the gage from the surface of the sheet or leaf to move the frame freely in either direction, the key 8 is depressed, thus moving the main gage-plate against the tension of its actuating-spring, and in order to communicate motion to all of the auxiliary gage-plates the rock-shaft is provided with a series of pins 13, one of which is arranged under each auxiliary gage-plate, as indicated in full lines in Fig. 3 and in dotted lines in Fig. 4. The advantage derived from the use of the sectional gage-plate, as above described, resides in the fact that when the tracks 1 are arranged in engagement with the desired seats in the base-bars 5 of the framework the auxiliary gage plates or sections which are in alinement with the selected seats are elevated at their rear or free ends and rest upon the upper smooth surfaces of the tracks and do not interfere with the desired operation of the other sections of the gage. In other words, this sectional construction of the gage provides for the automatic adjustment thereof to suit the interval between the tracks.

The line-spacing mechanism, which is indicated at 14 in Figs. 2 and 3 and which includes gears 15 for coöperation with the tracks, said gears being adjustable upon the spindle 16 to suit the interval between the tracks, is fully described in my said former application, Serial No. 489,634, and therefore requires no specific description herein.

The front and rear parallel carriage-guides 17 form members of the above-mentioned frame, and upon the same is mounted the carriage, upon which are arranged the printing and inking mechanisms. The body of the carriage, consisting of the front and rear sides 18 and the ends 19, is constructed of a single continuous strip of sheet metal, preferably steel, and to this body portion or frame are secured the floor 20 and the steps 21, also of sheet metal.

22 represents a removable plate forming the top of the carriage in rear of the keyboard, whereby access may be had to the key-levers and the means for communicating motion to the carriage-feeding mechanism. The stems of the keys 23 are mounted in openings in the steps 21, which combine to form the keyboard and are connected to the front ends of key-levers 24, pivoted at intermediate points to the upper ends of posts 25, rising from the floor of the carriage.

Depending from the body of the carriage are front and rear hangers 26 and 27, (shown clearly in Figs. 3 and 4,) which support the type-bar-supporting ring 28, (see Figs. 1, 3, 4, and 7,) said supporting-ring consisting of a flat segmental or crescent shaped bar, to the upper and lower surfaces of which are alternately secured the type-bar-bearing clips 29 and 30. The clips 29 are struck from sheet metal, as shown clearly in Fig. 8, and have their lateral edges upstruck to form parallel flanges 31, which terminate at their outer ends in bearing-eyes 32, and the clips 30 are also struck from sheet metal and are provided with parallel depending or downturned flanges 33, terminating at their outer ends in upturned bearing-eyes 34, which are doubled upon and bear against the outer surfaces of the flanges and rise above the plane of the body of the clip and also above the plane of the upper surface of the supporting-ring, said construction being clearly illustrated in Fig. 9. The clips 29 are secured to the upper surface of the supporting-ring with the bearing-eyes contiguous to the outer periphery thereof, and the clips 30 are secured to the under surface of the supporting-ring with the bearing-eyes 34 thereof arranged beyond the outer edge of the supporting-ring. The upper clips 29 are spaced apart, and the lower clips 30 are arranged opposite the intervals between the upper clips, whereby the type-bars 35, (shown in Fig. 3,) which are mounted in the upper clips, operate between the planes of the flanges of the clips in which they are mounted, and the type-bars which are mounted in the lower clips operate between the planes of the contiguous flanges 31 of the adjacent upper clips. In order to secure accurate alinement, I have found it desirable to mount the clips adjustably upon the supporting-ring, and the means which I have illustrated in the drawings for accomplishing this adjustment consist of locking-screws 36 for the upper clips, extending through radial slots 37 in the type-bar-supporting ring and engaging threaded apertures 38 in the said clips, and similar locking-screws 39, extending through longitudinal slots 40 in the lower clips and engaging threaded apertures 41 in the supporting-ring. (For this construction see Figs. 1, 3, 4, 7, 8, and 9.) The type-bars are connected with the extremities of the key-levers by means of draw rods or wires 42.

In order to reduce the number of type-bars, keys, and operating connections, I employ upper and lower case shifting mechanism comprising pivotal type-heads 43, mounted upon the extremities of the type-bars and held in the lower-case position by means of springs 44, as shown in Fig. 3, and as particularly shown and described in my former application, Serial No. 545,508, above mentioned. This type-head is provided with a trip-arm 45, projecting forwardly in the plane of the type-bar, and it is adapted to engage a shifting-arm 46, pivoted to the type-bar-supporting ring, adjacent to one extremity, by means of a clip 47, constructed substantially as described in connection with the upper type-bar-bearing clips 29 and provided with similar means of adjustment, as indicated in Fig. 1. The position of the shifting-arm 46 with relation to the type-bar-bearing clips is clearly illustrated in Fig. 4, in which said arm is in its horizontal or operative position and in which the position of the foremost type-bars when in engagement with the shifting-arm is indicated in dotted lines. The shifting-arm is provided with a crescent-shaped head 48, disposed with its center approximately coincident with the center of the type-bar-supporting ring, whereby the pivotal type-heads may enter the space between the arms of the head 48 and engage said head to shift the type-head to the upper-case position. The blade 49 of the shifting-arm is preferably of spring-steel and is secured to the stock or body portion 50 thereof by a screw 51 or its equivalent, said blade being adapted to yield sufficiently to relieve the mechanism of jar when the type-bar is brought to the printing position and the trip-arm on the head thereof engages the head of the shifting-arm. The means for communicating motion to the shifting-arm in the construction illustrated consists of a shift-key 52, provided with a return-spring 53 and connected by means of a rod 54 with the body portion of said arm.

The carriage-feeding mechanism is substantially the same as that shown and described in my said former application, Serial No. 530,400, consisting, essentially, of the lower fixed rack-bar 55 and the upper movable rack-bar 56, provided with a flange 57, with which coöperates a pin 58, carried by a lever 59, mounted parallel with the rear side of the carriage and connected to a key-lever 60, operated by a release-key 61. The pivotal pawl 62, which operates between the serrated edges of said rack-bars, projects rearwardly into the casing of the carriage and is connected, by means of a draw-wire 63, with a crank-arm 64 on a rock-shaft 65, which is arranged parallel with the rear side of the carriage. Said rock-shaft is provided with terminal crank-arms 66, connected to vertical slides 67, said slides being provided at their lower ends with guide-slots 68, engaging guide pins or screws 69, secured to the ends of the carriage-casing. Motion is communicated to the rock-shaft by means of pivotal yokes 70, having their parallel rearwardly-extending arms pivoted to the ends of the casing and engaged with pins 71 on the slides 67 and having their front bars 72, by which said arms are connected, arranged in the path of pins 73 on the key-stems. (For the above construction see Figs. 2, 3, 5, and 6.)

The crank-arm 64 is slotted, as shown at 74, for engagement by an adjustable pin 75, by which the upper extremity of the draw-wire 63 is connected thereto, and the extremity of said arm 64 is connected to a return-spring 76 (see Figs. 3 and 5) to return the crank-shaft, and hence the feed-pawl, to the normal position. In order to provide for the adjustment of the tension of said spring 76, I employ a bell-crank lever 77, pivoted to the rear side of the casing of the carriage, as shown in Fig. 5, and a tension-rod 78, connected to one arm of the bell-crank lever and provided with an adjustable head 79, mounted in the end of the casing. Said head is provided with a threaded shank 80, which engages a threaded socket 81 in the body portion of the tension-rod. The space-key 82 is provided with stems 83, having pins 84, which engage one of the cross-bars 72 of the yokes, as shown in Figs. 1 and 2.

Mounted to slide and rotate in bearings 85 at the ends of the casing are the spool-spindles 86, upon which are removably fitted the spools 87, being held in place by thumb-nuts 88. The spools are held in contact with said thumb-nuts 88 by means of springs 89, coiled upon the spindles and bearing at their rear ends against the front bearings 85, and rotary motion is communicated to the spool-spindles by means of ratchet-wheels 90 and pawls 91, all constructed substantially as shown in my said former applications. The means for imparting longitudinal or axial movement to the spools and including the connecting-bar 92 between the rear ends of the spindles, the traveler 93 on said connecting-bar, and the horizontal guide 94, inclined to the carriage-guide or to the line of writing are also fully described in my former applications above mentioned.

Depending from the ribbon-spool spindles and provided with arms 95, which are fitted to slide upon said spindles, respectively in front and in rear of the spools, are the ribbon-guides 96, having inturned lower extremities 97, which extend below the plane of the type-bar-supporting ring and beyond the inner edge thereof. These ribbon-guides are flanged outwardly at their front and rear edges, as shown at 98, to form a seat for the ribbon and prevent forward and rearward displacement thereof, and the horizontal or inturned lower portions of the same are provided with upstruck guiding-ears 99 which engage over guide-strips 100, secured by means of brackets 101 to the lower side of the type-bar-supporting ring. The inner extremities of the horizontal portions 97 are transversely slotted, as shown at 102, and through these slots the ribbon 103 passes, said ribbon resting upon the guide-lip 104 at the extremity of the guide. Arranged in the keyboard is a ribbon-shift key 105, having its stem connected to one arm 106 of a bell-crank lever, the lower arm 107 of said bell-crank lever being connected, by means of a link 108, with one of the ribbon-guides. Said bell-crank lever is fixed to the rock-shaft 109, extending parallel with the line of writing and provided at the end remote from the shifting-key 105 with a depending arm 110, connected by a link 111 with the contiguous ribbon-guide. Said ribbon-shifting key is provided with a return-spring 112, and by its depression the ribbon-guides are simultaneously moved to the rear in the direction indicated by the arrow in Fig. 3 to expose the line of writing.

In connection with the above-described construction I employ a table 113, (see Figs. 1, 3, and 12,) provided contiguous to one end and parallel with the edge with a vertically-adjustable supporting-strip 114, provided with a depending slotted arm 115, which operates in a guide-groove 116 in the guide-block 117. Extending through the slot 118 of said arm is a locking-rod 119, provided with a shoulder 120, to bear against the outer surface of the slotted arm and threaded in a nut 121 in the guide-block. Said locking-rod extends through the front bar 122 of the table and is provided with a hand-wheel 123. In order to raise the supporting-strip when released by unscrewing the locking-rod, I employ an elevating-spring 124, seated at its lower end in an ear 125 on the guide-block and coiled around a stem 126, depending from the supporting-strip. In order to depress the strip to hold the book at the desired elevation, one hand of the operator should be placed upon the surface of the book, and when the desired level is reached the locking-rod may be operated to clamp the parts in place.

From the above description it will be seen that the sheet or page to be printed is held in the desired position by means of the printing plate or platen arranged thereunder and the tracks disposed upon the upper surface of said sheet or page, the book-supporting strip being adjusted to arrange the page in a level position, and in order to provide for adjusting either side of the book without changing the position of the book I provide at 127 a second supporting-strip provided with means for adjusting the same which are the duplicate of those described in connection with the strip 114.

It will be seen, furthermore, that the tape 128 of the carriage-actuating spring 129, which imparts forward movement to the carriage and is attached to the carriage-casing contiguous to its rear side, will not cause twisting or vibration of the carriage, for the reason that the interval between the carriage-guides is small, and hence the strain of the carriage-spring is direct. I am enabled to arrange said guides at the minimum distance apart by reason of the disposal of the type-bar-supporting ring below the plane thereof and constructing the same of the crescent or segmental shape described and, furthermore, by reason of the fact that the keyboard, keys, and operating connections are disposed between the vertical planes of said front and rear guides. The base required for a carriage thus constructed may be small, inasmuch as the center of gravity is contiguous to or slightly below the horizontal plane of the guides.

A further advantage of the arrangement of the keyboard between the vertical planes of the guides is that it allows the operator a free view of the line of writing while sitting in the usual position in front of the machine. Furthermore, the key-levers are constructed of the minimum length, and the draw rods or wires 42, which connect said key-levers with the type-bars, extend vertically downward through a segmental slot 130, (see Fig. 2,) formed in the floor of the carriage-casing.

In order to prevent the carriage from leaving the guides by accident or otherwise and serve as a stop to limit the movement of the carriage in both directions to the length of the line which may be printed between the tracks, I employ a stop secured to the under side of the type-bar-supporting ring at its center and consisting of depending ears 131, the lower extremities of which are disposed below the planes of the upper sides of the tracks, whereby said ears engage the tracks and are checked thereby. This stop, which is permanently fixed to the carriage, determines the full length of the lines which may be printed at any adjustment of the tracks.

The object in arranging the stop contiguous to the printing-point of the carriage and in the plane of the tracks is that it provides for adjusting the tracks to suit the width of the page without reference to the length of the carriage-guides, whereby the latter may be made equal to or greater than the greatest length of line desired. A further advantage of this construction resides in the fact that the stop for the carriage is thus arranged approximately in the plane of the center of gravity or of the heaviest portion of the carriage, whereby when the movement of the carriage is checked the parts thereof, particularly the hangers for the supporting-ring, are not strained, as would be the case with a pendent type-bar-supporting ring if the carriage were checked in or near the plane of the carriage-guides.

In Fig. 13 I have shown slightly-different means for securing the adjustable track to the platen, the same consisting of pins 132, depending from the track and engaging perforations or sockets 133 in the platen.

It will be understood that while I have shown springs 89 upon the spool-spindles for assisting in returning the spools to their operative position in contact with the stops 88 I am depending upon the spring 112 to return these parts by making said spring 112 of sufficient strength, and in practice I have found the operation of the parts to be satisfactory when relying solely upon the spring 112, thereby avoiding complications of the construction contiguous to the ribbon-spools.

In the drawings the series of bearing-clips is shown as occupying slightly less than a semicircle, whereby the foremost type-bars strike past the near horns or arms of the crescent-shaped head of the shifting-bar to cause the engagement of the trip-arm on the type-head with the far or remote horn or arm of said crescent-shaped head; but it will be understood that inasmuch as the trip-arm inclines downward below the plane of the lower surface of the type-bar the series of clips may be extended, and the crescent-shaped head may be correspondingly extended, as may be found necessary in practice. The type-bars are adapted to strike over the near horn or arm of the head of the shifting-arm to engage the other horn or arm, while the printing-face of the type-head passes down between the horns or arms.

Various changes in the form, proportion, and the minor details of construction may be resorted to without departing from the spirit or sacrificing any of the advantages of this invention.

Having described my invention, what I claim is—

1. In a type-writing machine, the combination with carriage-guides, a carriage having a crescent type-bar-supporting ring, carriage-feeding mechanism, and type-bars having pivotal type-heads provided with trip-arms, of a pivotal shifting-arm having a head adapted to be arranged in the path of said trip-arms for engagement thereby when the type-head reaches the printing-plane, the shifting-arm having a spring-blade carrying said head, and means for operating the shifting-arm so as to hold the type-head in its adjusted position while the impression is being made, substantially as specified.

2. In a type-writing machine, a carriage mounted upon guides for movement parallel with the line of writing and having a casing constructed of sheet metal bent at intervals to form front and rear sides and ends, a slotted bottom or floor, a keyboard closing the front portion of the top of the casing, and a removable plate closing the rear portion of the same, the key-levers being arranged within the casing, and draw-wires for connection with type-bars extending through the slots in the bottom or floor, substantially as specified.

3. In a type-writing machine, the combination with a type-bar-supporting ring, of upper and lower type-bar-bearing clips secured, respectively, to the upper and lower surfaces of the supporting-ring, the upper bearing-clips having lateral upstruck flanges terminating at their outer ends in bearing-eyes and arranged at intervals on the ring, and the lower bearing-clips being provided beyond the outer edge of the supporting-ring with upturned bearing-eyes, terminating approximately in the plane of the bearing-eyes on the upper clips, and type-bars mounted in said bearing-eyes, substantially as specified.

4. In a type-writing machine, the combination with a type-bar-supporting ring, of upper and lower type-bar-bearing clips secured, respectively, to the upper and lower surfaces of the supporting-ring, the upper bearing-clips being arranged at intervals upon the supporting-ring and having upstruck lateral flanges and bearing-eyes, and the lower bearing-clips having downturned lateral flanges provided beyond the outer periphery of the supporting-ring with upturned bearing-eyes, the lower bearing-clips being arranged below the intervals between the upper bearing-clips, and type-bars mounted in the bearings of the clips, substantially as specified.

5. In a type-writing machine, the combination with a type-bar-supporting ring, of type-bar-bearing clips arranged alternately above and below the plane of the supporting-ring and provided, respectively, with threaded openings and longitudinal slots, the supporting-ring being provided, respectively, in the planes of the upper and lower clips with slots and threaded perforations, and screws engaging the registering slots and perforations to secure the clips at the desired radial adjustment, substantially as specified.

6. In a type-writing machine, the combintion with carriage and printing mechanism, of vertical slides mounted upon the carriage and operatively connected with the printing mechanism, a rock-shaft having crank-arms connected to said slides, a feed-pawl arranged in operative relation with a rack, connections between said feed-pawl and the rock-shaft, a return-spring for the rock-shaft to return the feed-pawl to its normal position, and a tension-rod connected at one end by a lever with said return-spring and provided at the other end with an adjustable exposed head having a stem threaded in a socket in the body portion of the rod, substantially as specified.

7. In a type-writing machine, the combination with a type-bar-supporting ring of ribbon-spools mounted for axial movement above the plane of the supporting-ring, ribbon-guides mounted for movement simultaneous with the ribbon-spools and depending therefrom, said ribbon-guides having horizontal inturned lower extremities and upstruck clips in said horizontal extremities, and guide-strips carried by the type-bar-supporting ring and arranged transverse to the line of writing for engagement by the upstruck clips, substantially as specified.

8. In a type-writing machine, the combination with printing mechanism including a type-bar-supporting ring, of ribbon-spools mounted for axial movement transverse to the line of writing, ribbon-guides mounted upon the spindles of the ribbon-spools and extending to a point below the plane of the type-bar-supporting ring, a ribbon-shifting key, a rock-shaft connected to the ribbon-shifting key, and connections between the rock-shaft and said ribbon-guide, whereby the latter may be moved transversely to the line of writing to expose the same, substantially as specified.

9. In a type-writing machine, the combination with a type-bar-supporting ring, of ribbon-spools mounted for axial movement above the plane of the supporting-ring and transverse to the line of writing, ribbon-guides mounted for movement simultaneous with the ribbon-spools and depending therefrom, said ribbon-guides having horizontal inturned lower extremities, and guide-strips carried by the type-bar-supporting ring transverse to the line of writing and having an interlocking sliding connection with the ribbon-guides, substantially as specified.

10. In a type-writing machine, the combination with printing mechanism including a type-bar-supporting ring, of ribbon-spools mounted for axial movement transverse to the line of writing, ribbon-guides mounted upon the spindles of the ribbon-spools and extending to a point below the plane of the type-bar-supporting ring, a ribbon-shifting key, and connections between the shifting-key and said ribbon-guide whereby the latter may be moved transversely to the line of writing to expose the same, substantially as specified.

11. In a type-writing machine, the combination with parallel tracks adapted to be arranged upon a page of a book, and a frame mounted upon the tracks for movement parallel therewith, of a table having countersunk vertically-adjustable supporting-strips adapted to be arranged, respectively, under the opposite sides of a book to support the same in a horizontal position, an elevating-spring arranged under each supporting-strip and adapted to elevate the same with the superposed portion of a book, and a shouldered locking-arm threaded in a fixed guide and extending through a slotted arm on the supporting-strip with its shoulder in contact with said arm, the locking-arm extending to and beyond the front of the table and terminating in means whereby it may be rotated to secure the strip at the desired vertical adjustment, substantially as specified.

12. A support for a type-writing machine, comprising a platen having a uniformly-smooth and continuously-unobstructed upper surface to continuously support a leaf or sheet throughout its extent where the printing is to be effected, and separate parallel tracks or guides, for the movable frame of the type-writing machine, spanning the upper surface of the platen to rest upon the sheet or leaf on lines respectively at opposite sides of the printing area, and hold said sheet or leaf in place, one of said tracks or guides being transversely adjustable upon the platen, toward and from the other track or guide, substantially as specified.

13. A support for a type-writing machine, comprising a platen having a uniformly-smooth and continuously-unobstructed upper surface to continuously support a leaf or sheet throughout its extent where the printing is to be effected, and separate parallel tracks or guides, for the movable frame of the type-writing machine, spanning the upper surface of the platen to rest upon the sheet or leaf on lines respectively at opposite sides of the printing area, and hold said sheet or leaf in place, one of said tracks or guides being unconnected with, and the other being adjustably mounted upon, the platen, the adjustable track or guide being movable toward and from the other track or guide, substantially as specified.

14. A support for a type-writing machine, comprising a platen having a uniformly-smooth and continuously-unobstructed upper surface to continuously support a leaf or sheet throughout its extent where the printing is to be effected, and separate parallel tracks or guides, for the movable frame of the type-writing machine, spanning the upper surface of the platen to rest upon the sheet or leaf on lines respectively at opposite sides of the printing area, to hold said sheet or leaf in place, one of said tracks or guides having an interlocking connection with the platen at points beyond the opposite edges of the sheet or leaf supported by the latter, substantially as specified.

15. A support for a type-writing machine, comprising a platen having a uniformly-smooth and continuously-unobstructed upper surface to continuously support a leaf or sheet throughout its extent where the printing is to be effected, and separate parallel tracks or guides, for the movable frame of the type-writing machine, spanning the upper surface of the platen to rest upon the sheet or leaf on lines respectively at opposite sides of the printing area, to hold said sheet or leaf in place, both of said tracks or guides being separable from the platen, and one of them being provided, at an interval in excess of the length of the engaged sheet or leaf, with means for engaging the platen, substantially as specified.

16. A support for a type-writing machine, comprising a platen having a uniformly-smooth and continuously-unobstructed upper surface to continuously support a leaf or sheet throughout its extent where the printing is to be effected, and separate parallel tracks or guides, for the movable frame of the type-writing machine, spanning the upper surface of the platen to rest upon the sheet or leaf on lines respectively at opposite sides of the printing area, to hold said sheet or leaf in place, one of said tracks or guides having spaced clips for adjustably engaging the opposite edges of the platen, substantially as specified.

17. A support for a type-writing machine, comprising a platen having a uniformly-smooth and continuously-unobstructed upper surface to continuously support a leaf or sheet throughout its extent where the printing is to be effected, and disconnected parallel tracks or guides, for the movable frame of the type-writing machine, spanning the upper surface of the platen, to rest upon the sheet or leaf on lines respectively at opposite sides of the printing area, and holding said sheet or leaf in place, substantially as specified.

In testimony that I claim the foregoing as my own I have hereto affixed my signature in the presence of two witnesses.

ROBERT JOSEPH FISHER.

Witnesses:

WILLIAM A. CUNNINGHAM,
CHARLES T. RIDDLE.